United States Patent
Knepp

(10) Patent No.: US 9,211,900 B2
(45) Date of Patent: Dec. 15, 2015

(54) TUGGER AND RIDER CART ASSEMBLY

(71) Applicant: Joseph Wayne Knepp, East Peoria, IL (US)

(72) Inventor: Joseph Wayne Knepp, East Peoria, IL (US)

( * ) Notice: Subject to any disclaimer, the term of this patent is extended or adjusted under 35 U.S.C. 154(b) by 0 days.

(21) Appl. No.: 14/179,157

(22) Filed: Feb. 12, 2014

(65) Prior Publication Data
US 2015/0225007 A1  Aug. 13, 2015

(51) Int. Cl.
*B62B 3/06* (2006.01)
*B62B 3/08* (2006.01)

(52) U.S. Cl.
CPC .... *B62B 3/06* (2013.01); *B62B 3/08* (2013.01)

(58) Field of Classification Search
CPC .............. B62B 3/02; B62B 3/04; B62B 3/06; B62B 3/14; B62B 3/1476; B62B 2202/90; B62B 2202/92
USPC ............... 280/47.34, 47.35, 79.11, 79.2, 408, 280/411.1; 414/390, 391, 395
See application file for complete search history.

(56) References Cited

U.S. PATENT DOCUMENTS

| | | | | |
|---|---|---|---|---|
| 3,122,244 | A * | 2/1964 | Corso | B25B 11/00 104/34 |
| 4,127,202 | A * | 11/1978 | Jennings | B60D 1/173 280/408 |
| 5,072,960 | A * | 12/1991 | Sperko | B62B 3/04 16/35 D |
| 6,866,463 | B2 * | 3/2005 | Riordan | B62B 3/04 280/79.3 |
| 8,302,975 | B2 * | 11/2012 | Hergeth | B62B 3/04 280/47.19 |

FOREIGN PATENT DOCUMENTS

EP    2226240 B1    7/2011

OTHER PUBLICATIONS

PCT International Search Report for International Application No. PCT/US 14/55108 (International Application claiming priority to this US application), issued Dec. 22, 2014.
J-Tec Industries, CarryMore Tugger Video 0:01-01:46, available online at https://www.youtube.com/watch?v=fqk5X_43vfw, Aug. 9, 2013.
PCT Written Opinion of the International Searching Authority for Application No. PCT/US 14/55108 (International Application claiming priority to this US application), issued Dec. 22, 2014.

* cited by examiner

*Primary Examiner* — John Walters

(57) ABSTRACT

A tugger cart that has a first side, a second side and a locking portion is provided. The first side and second side may include guide wheels aligned in an upward slant. The locking portion may include a rocking arm that is pivotally attached to the tugger cart. The rocking arm may include a lock pedal and an unlock pedal. A rider cart may include a first side and a second side. The first and second side may include wings that are slanted upward, similar to the guide wheels. The rider cart may be pushed onto the tugger cart and the wings may roll along the guide wheels. The rider cart may apply pressure to the lock pedal and the unlock pedal may pivot upward, locking the rider cart onto the tugger cart. To unlock the rider cart, the unlock pedal may be pushed downward, and the rider cart may be removed.

16 Claims, 5 Drawing Sheets

TUGGER AND RIDER CART ASSEMBLY

BACKGROUND OF THE INVENTION

The present invention relates to a tugger and rider cart assembly and, more particularly, to a rider cart that may be easily attached to a tugger cart.

In the world of intra-plant material handling, a common approach to conveying material from one location to another is called a tugger/push cart system. The system consists of three components; a tugger truck, tugger cart, and push cart. The tugger truck pulls a train of tugger carts, with push carts on board, from location to location in a factory or warehouse. For example, the push carts are loaded with material at a picking station or supermarket. They are then loaded on to the tugger carts. After that, they are tugged to the unload area, unloaded off of the tugger carts, and pushed into their final position on the assembly line. At this point, the empty tugger carts may be reloaded with empty push carts and returned to the picking station.

One issue companies have with this type of system is being able to efficiently and ergonomically load and unload the push carts on to the tugger carts. Currently, hydraulic and manual devices are used. The hydraulic lift solution increases cost, presents plant safety issues (oil on the floor), and requires more equipment maintenance. Also, if a plant already has a fleet of tugger trucks they will probably have to change their entire fleet to special tugger trucks that have hydraulic systems driving even more cost. Both methods require an operator to pull a cart out of the tugger cart which is a very difficult motion and can cause an operator to over exert himself. The manual solution requires four swivel casters which makes the carts difficult to control while being pushed.

As can be seen, there is a need for an improved tugger and push cart system.

SUMMARY OF THE INVENTION

In one aspect of the present invention, a tugger cart comprises: a tugger frame comprising a bottom, a top, a first side, a second side, a locking portion, a front end and a rear end, wherein the first side, the second side, and the locking portion are joined together, wherein the first side, and the second side form an inside portion in between, and an outside portion; a plurality of guide wheels attached within the inside portion of the frame, wherein the plurality of guide wheels together form a slanted line slanting upward from the front end to the rear end; and a plurality of casters attached to the bottom of the tugger frame; wherein the locking portion is configured to releasably secure a rider cart to the tugger frame when the rider cart is rolled onto the plurality of guide wheels.

These and other features, aspects and advantages of the present invention will become better understood with reference to the following drawings, description and claims.

DETAILED DESCRIPTION OF THE INVENTION

Figure 1:
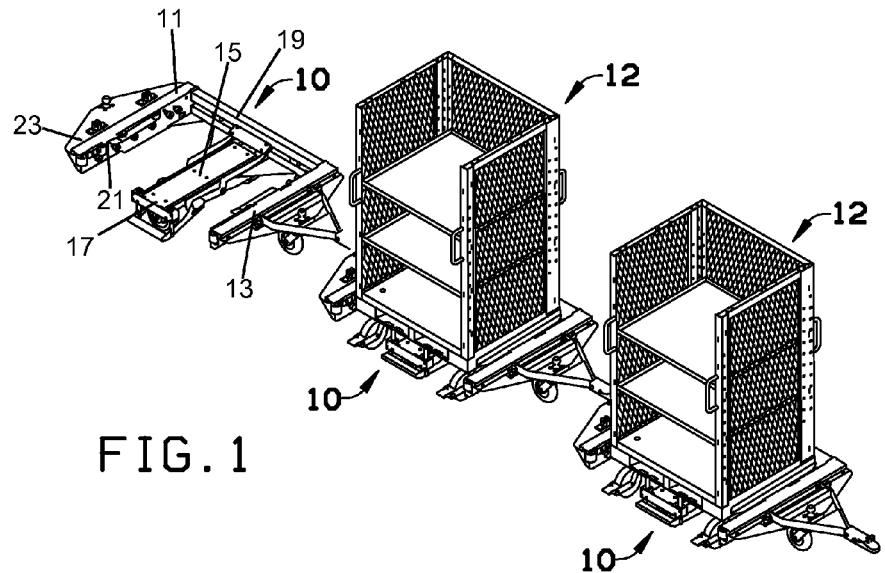
FIG. 1 is a perspective view of the present invention, shown in use.
Figure 2:
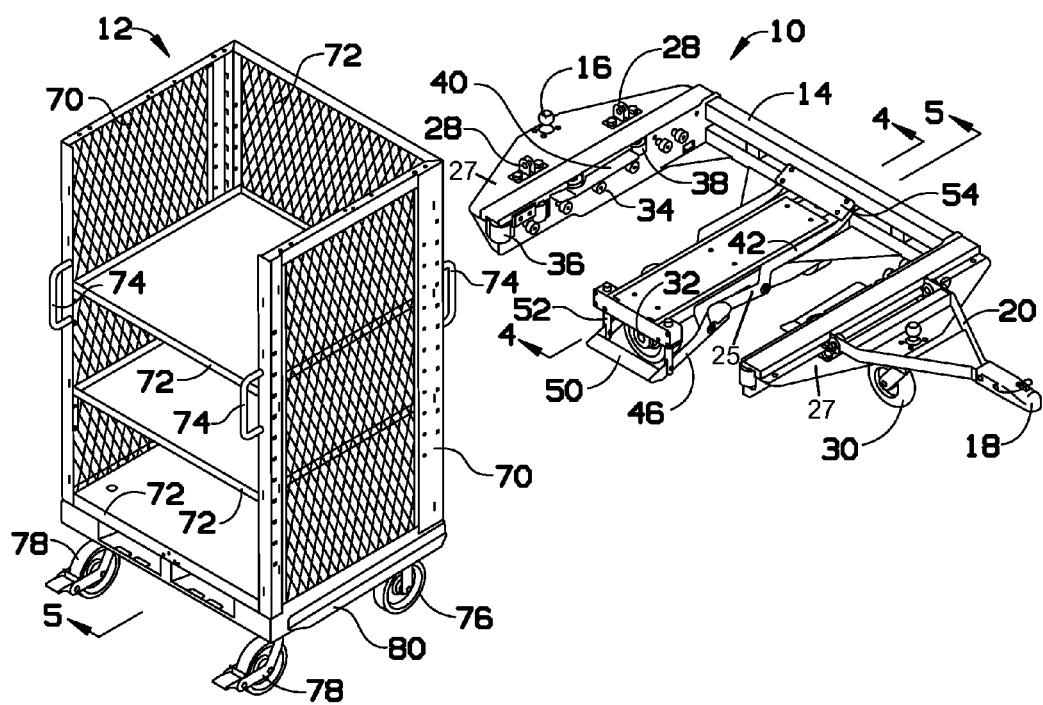
FIG. 2 is a perspective view of the present invention.
Figure 3:
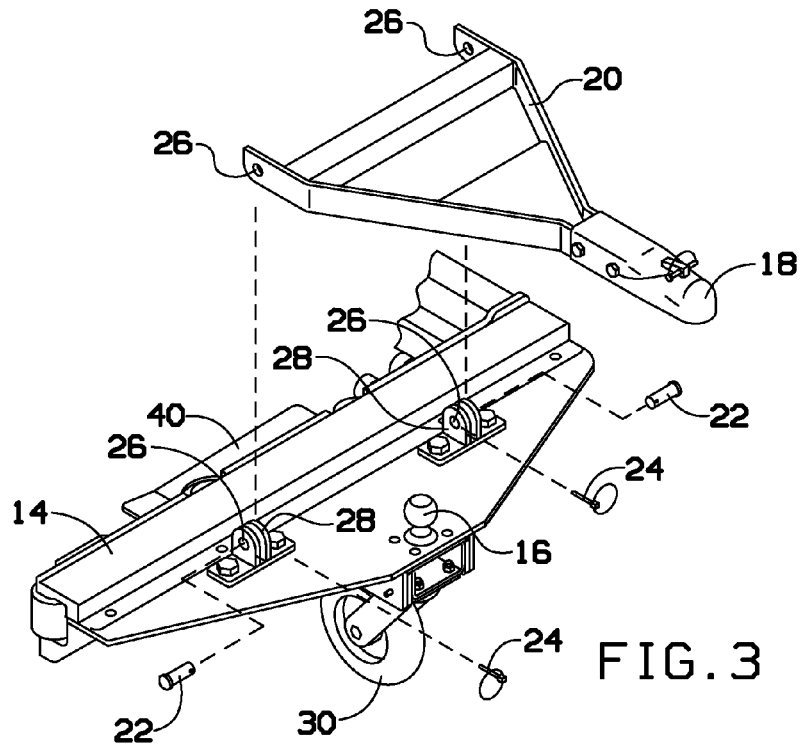
FIG. 3 is a detail exploded view of the present invention.
Figure 4:
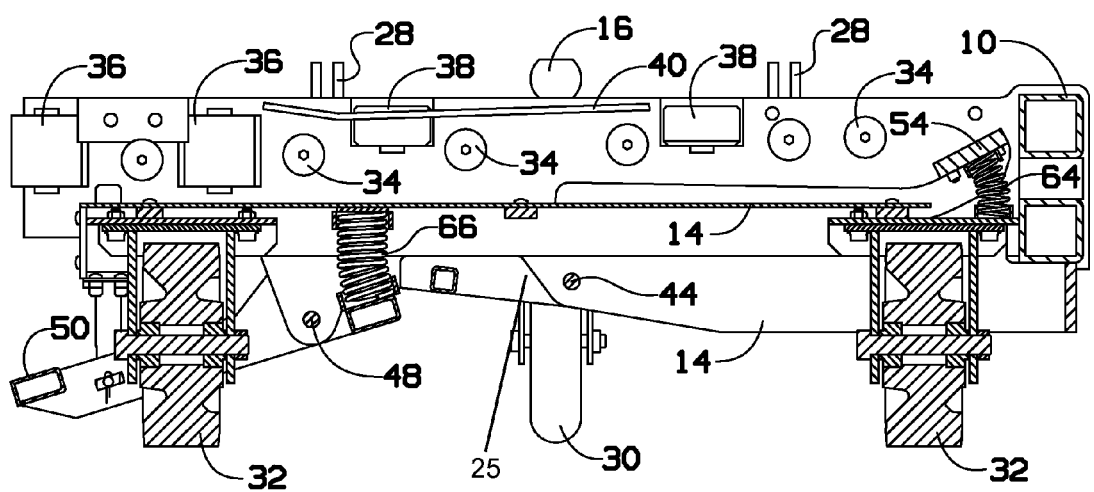
FIG. 4 is a section view of the present invention, taken along line 4-4 in FIG. 2.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a tugger cart that has a first side, a second side and a locking portion. The first side and second side may include guide wheels aligned in an upward slant. The locking portion may include a rocking arm that is pivotally attached to the tugger cart. The rocking arm may include a lock pedal and an unlock pedal. A rider cart may include a first side and a second side. The first and second side may include wings that are slanted upward, similar to the guide wheels. The rider cart may be pushed onto the tugger cart and the wings may roll along the guide wheels. The rider cart may apply pressure to the lock pedal and the unlock pedal may pivot upward, locking the rider cart onto the tugger cart. To unlock the rider cart, the unlock pedal may be pushed downward, and the rider cart may be removed.

The present invention may include a loading system that allows a push cart to be loaded on a tugger cart. As the push cart is loaded on the tugger cart the present invention may elevate the push cart using a lift system. For unloading, the operator releases the push cart which slowly rolls off of the tugger cart. The lift functionality allows the push carts to have two swivel casters and two fixed casters which make the carts more controllable than a push cart with four swivel casters. The present invention may also eliminate the need to pull the push cart off of the tugger cart which is a very difficult motion.

In certain embodiments of the present invention, the lift functionality may be achieved by pushing the push cart up a slight incline. The present invention may improve operator control when pushing the push carts and ergonomics of unloading. In certain embodiments, there may be multiple guide wheels with equal spacing in a row on the both sides of the inside of the tugger carts. The first guide wheel may be lower than the last guide wheel making an incline at a slight angle. The push cart may have a metal wing located on both sides positioned at a slight angle. When an operator pushes the push cart on to the tugger cart the metal wings on the push cart roll on top of the rows of guide wheels on the tugger cart and lifts the push cart off of the ground. When the push cart is unlocked from the tugger cart, the wings on the push cart roll on top of the rows of guide wheels on the tugger cart, lowering the cart to ground level as it comes out.

Referring to FIGS. 1 through 9, the present invention may include a tugger cart 10. The tugger cart 10 may have a tugger frame 14. The tugger frame 14 may include a bottom, a top, a first side 11, a second side 13, a locking portion 15, a front end 17, and a rear end 19. The locking portion 15 may be a middle section in between the first side 11 and the second side 13. The first side 11, the locking portion 15, and the second side 13 may be joined together at the rear end 19 and may form channels in between. The first side 11 and the second side 13 may form an inside portion 21 and an outside portion 23. A plurality of casters 30, 32 may be attached to the bottom of the tugger frame 14. For example, a swivel caster 30 may be attached to the bottom of the first side 11 and second side 13, and a pair of fixed casters 32 may be attached to the middle section. A plurality of vertical guide wheels 34 may be attached to the inside portion 21 of the first side 11 and the second side 13, or alternatively to the middle section. The vertical guide wheels 34 may rotate vertically relative to the tugger cart 10. The plurality of vertical guide wheels 34 may align together to form a slanted line. The slanted line may slant upward from the front end 17 to the rear end 19 of the tugger cart 10. In certain embodiments, anti tip wings 40 may be attached to the inside portion 21 of the first side 11 and the second side 13. The anti tip wings 40 may be oriented above the plurality of vertical guide wheels 34 and may be substantially parallel to the slanted line of the plurality of vertical guide wheels 34. The present invention may further include at least one first horizontal guide wheel 36 near the front end 17 of the first side 11 and the second side 13. The present invention may further include at least one second horizontal guide wheel 38 attached to the inside portion above the anti tip wings 40. The first and second horizontal guide wheels 36, 38 may rotate horizontally relative to the tugger cart 10.

In certain embodiments, the locking portion includes a latch system. The latch system may include at least one rocking arm 25 pivotally attached to the tugger frame 14 at a pivot point. The at least one rocking arm 25 may include a lock pedal 54 near the rear end 19 of the tugger frame 14 and an unlock pedal 50 near the front end 17 of the tugger frame 14. At least one locking peg 52 may be attached to the at least one rocking arm 25 and may protrude upwards. The lock pedal 54 may be biased in an upward position and the unlock pedal 50 may be biased in a downward position. When the lock pedal 54 is forced downward, the unlock pedal 50 and the at least one locking peg 52 are forced upward. The at least one locking peg 52 may include two locking pegs 52.

In certain embodiments, the at least one rocking arm 25 may include a rear arm 42 pivotally attached to the middle section at a first pivot point 44, and a front arm 46 pivotally attached to the middle section at a second pivot point 48. In such embodiments, the lock pedal 54 may be attached to the rear arm 42 and the unlock pedal 50 may be attached to the front arm 46. The at least one locking peg 52 may also be attached to the front arm 46 near the unlock pedal 50. The rear arm 42 and the front arm 46 may interlock at a lock notch 58 and an unlock notch 56.

In certain embodiments, the lock pedal 54 of the rear arm 42 may be spring biased upwards by a rear spring 64 and the unlock pedal 50 of the front arm 46 may be spring biased upwards by a front spring 66. In such embodiments, when the rear arm 42 and the front arm 46 are interlocked in the unlock notch 56, the unlock pedal 50 and the at least one locking peg 54 are forced downward in an unlocked position. Therefore, the unlock pedal 50 is temporarily biased in the downward position due to the force applied by the rear arm 42. When pressure is applied to the lock pedal 54, the rear arm 42 and the front arm 46 are shifted and interlocked in the lock notch 58 and the unlock pedal 50 and the at least one locking peg 52 are released upward. In certain embodiments, a post pivot pin 60 may connect the lock pedal pegs 52 to the front arm 46 and may shift within a front arm pivot slot 62 when the lock pedal pegs 52 are pivoted from the unlocked position to the locked position.

In certain embodiments, the present invention may include a plurality of tugger carts 10, such as a first tugger cart 10 and a second tugger cart 10. The first tugger cart 10 and the second tugger cart 10 may be releasably attachable. For example, the tugger cart 10 may include a rim 27 protruding from the first side 11 and the second side 13. The rim 27 may include a top surface. At least one hitch frame attachment post 28 and a ball 16 may be attached to the top surface of the rim 27. The present invention may further include a frame 20 having a first side and a second side. The second side may be a hitch receiver 18 and the first side may releasably attach to the hitch frame attachment post 28. For example, the second side may include flanges with peg holes 26 that may fit within a channel of the hitch frame attachment post 28 and align with peg holes 26 formed in the hitch frame attachment post 28. A hitch receiver peg 22 may be placed within the aligned peg holes 26 and may be secured by a locking pin 24. To attach the first and second tugger carts 10, the first tugger cart 10 may include an attached frame 20 and the hitch receiver of the attached frame 20 may be coupled with the ball 16 of the second tugger cart 10.

The present invention may further include a rider cart 12 formed to be transported on the tugger carts 10. The rider cart 12 may include a rider frame 68 having a front end, a rear end, a first side, a second side, a top and a bottom. A plurality of casters 76, 78 may be attached to the bottom. For example, a pair of swivel casters 78 may be attached to the bottom near the rear end and a pair of fixed casters 76 may be attached to the bottom near the front end. The rider cart 12 may further include a first rider wing 80 attached to the first side and a second rider wing 80 attached to the second side. The first and second rider wings 80 may be slanted upward from the rear end to the front end.

The rider cart 12 may include different components for different uses. For example, the rider cart 12 may include sidewalls 70 with shelves 72 in between to transport goods. The rider cart 12 may further include handles 74 to easily push or pull the rider cart 12 with ease. In certain embodiments, the rider cart 12 of the present invention may include a flatbed rider cart 82 without sidewalls 70 and a large flatbed handle 84 near the rear. In certain embodiments, the rider cart 12 may include a picker cart 88, in which the sidewalls 70 may have swinging doors 90 attached. In such embodiments, a top spreader 92 may be attached to opposing sidewalls 70.

Figure 5:
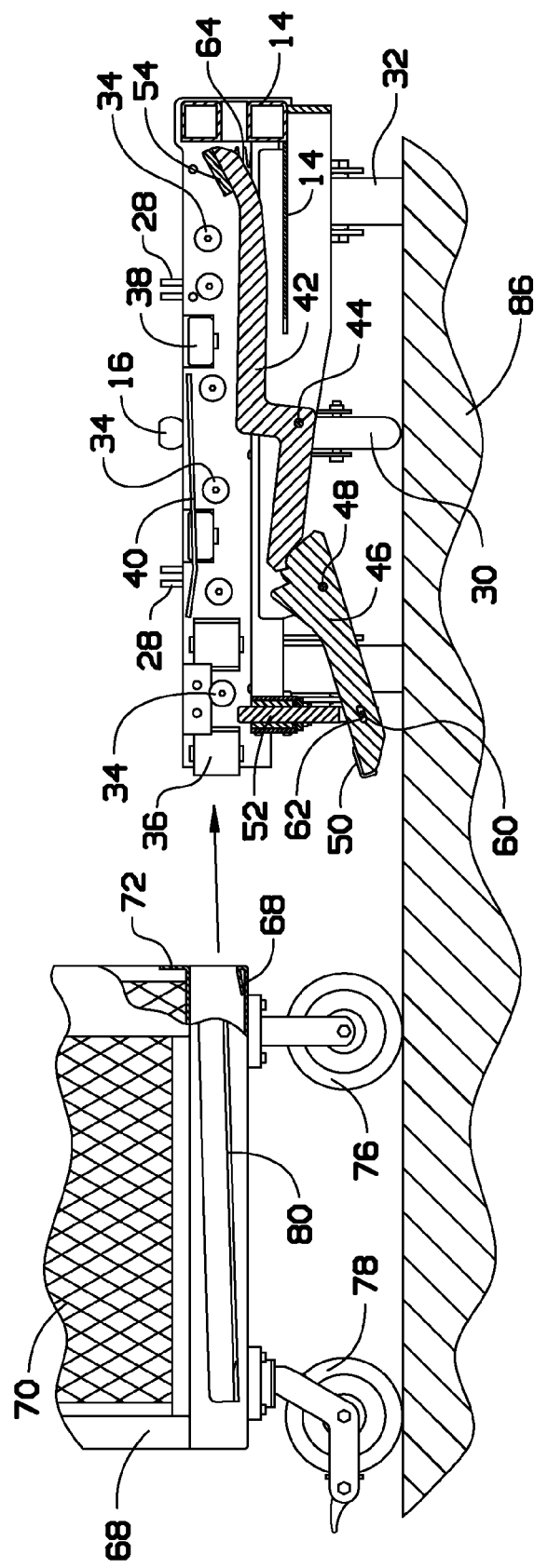
FIG. 5 is a section view of the present invention, taken along line 5-5 in FIG. 2.
Figure 6:
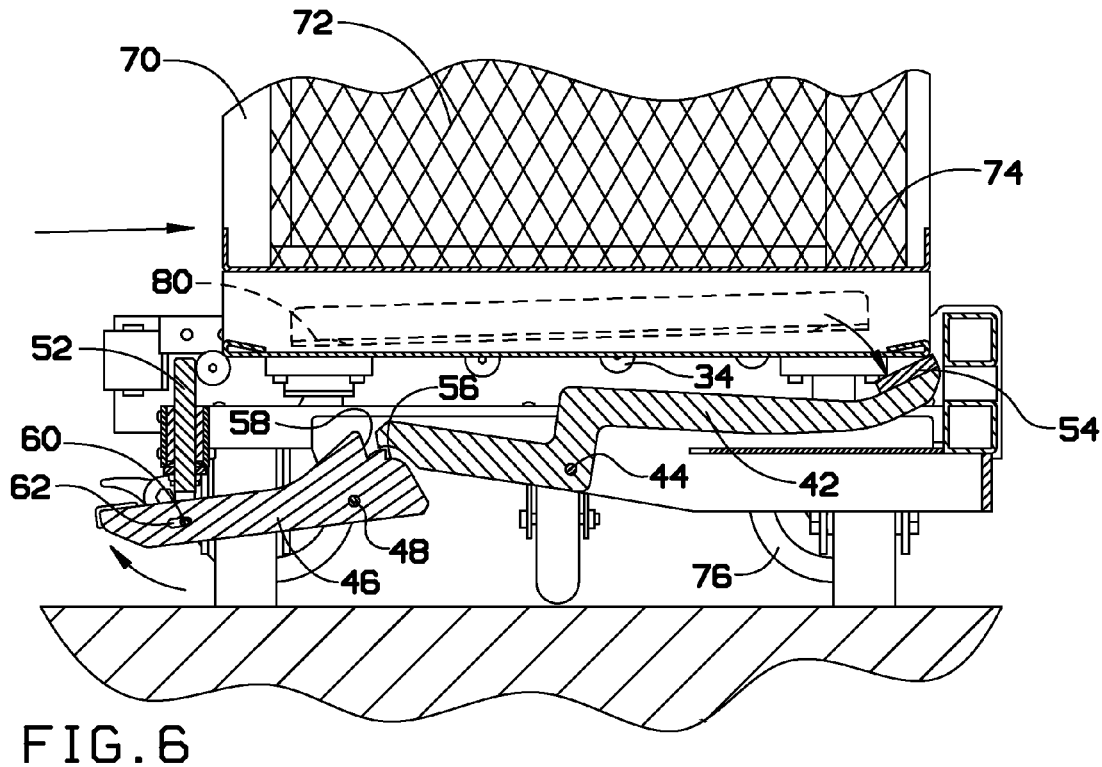
FIG. 6 is a section view of the present invention, illustrating the movement of the rear arm from the unlock notch to the lock notch.
Figure 7:
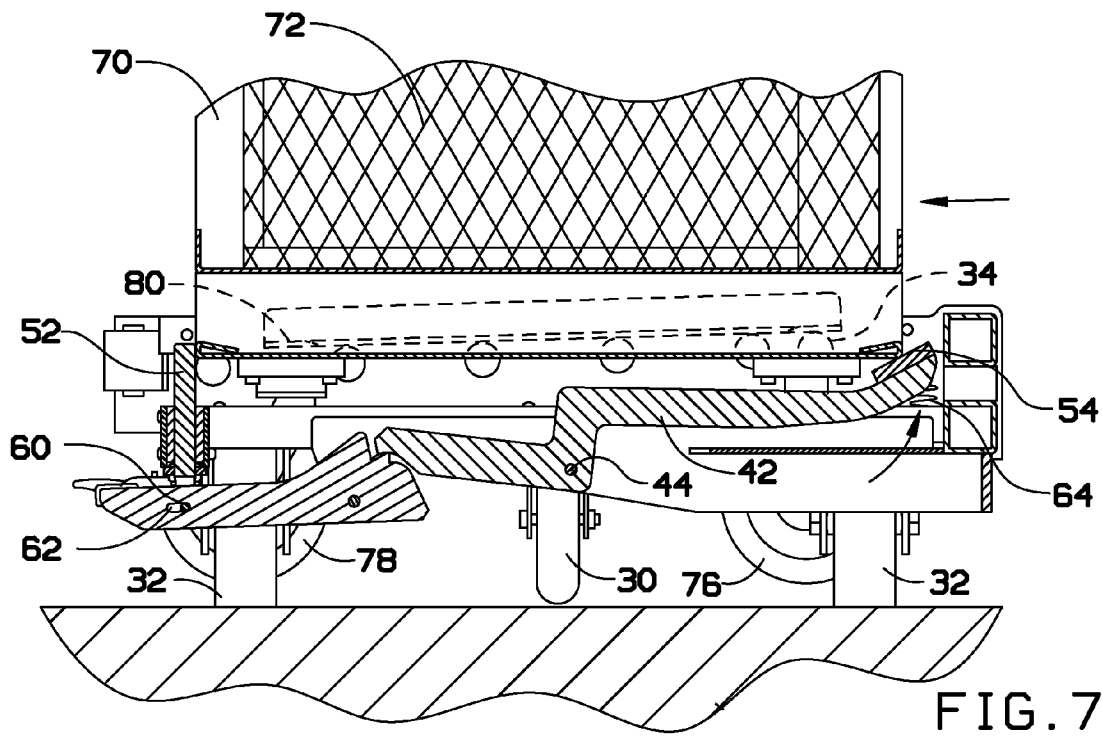
FIG. 7 is a section view of the invention, illustrating the tugger cart of FIG. 1 being in the locked position.
Figure 8:
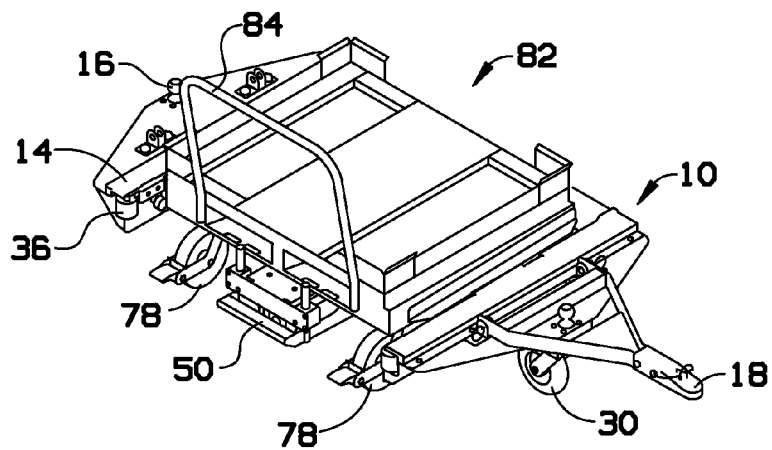
FIG. 8 is a perspective view of an alternate embodiment of the present invention.
Figure 9:
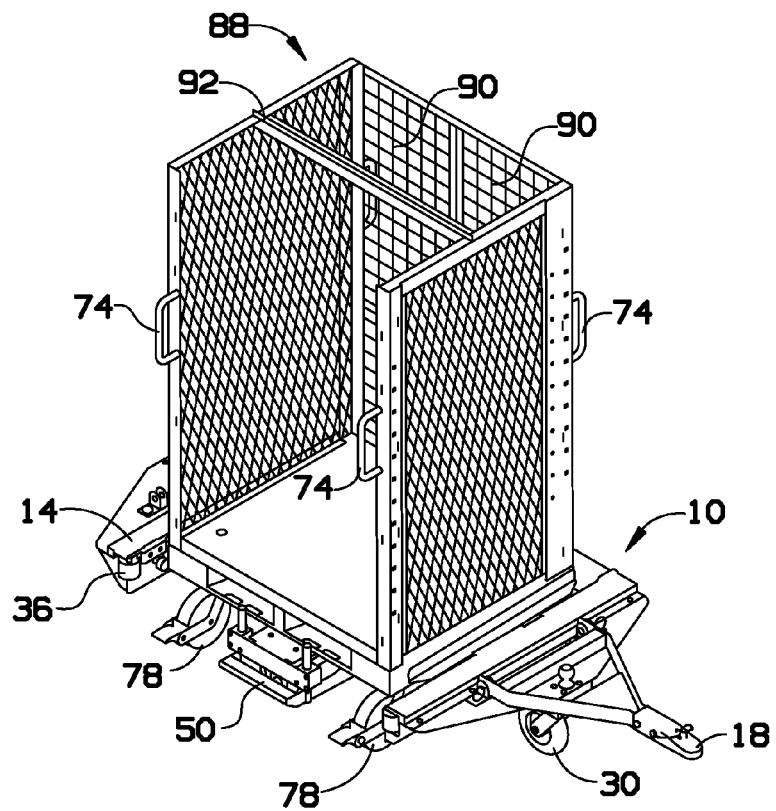
FIG. 9 is a perspective view of an alternate embodiment of present the invention.

As illustrated in FIGS. 5 through 7, the rider carts 12 may be pushed and locked onto the tugger carts 10. The rider cart 12 may be mounted onto the tugger cart 10 in a locked position and dismounted from the tugger cart 12 in an unlocked position. The rider wings 80 of the rider cart 12 may be pushed along the vertical guide wheels 34 until the rider cart 12 hits the lock pedal 54. The rider cart frame 68 may apply force against the lock pedal 54. The lock pedal 54 may pivot along pivot point 44. The rear arm 42 may lift out of the unlock notch 56 and the front arm 46 may pivot along pivot point 48. The front arm 46 pivots so that the unlock pedal 50 and the peg 52 shift upward and the peg 52 may block the rider cart 12 from rolling off of the tugger cart 10 in the locked position. The rear arm 42 may rest within the lock notch 58. To remove the rider cart 12 from the tugger cart 10, a user may push down on the unlock pedal 50 downwards so that the peg 52 is no longer blocking the rider cart 12. The rider cart 12 may be removed and the rear arm 42 is set back in the unlock notch 56.

It should be understood, of course, that the foregoing relates to exemplary embodiments of the invention and that modifications may be made without departing from the spirit and scope of the invention as set forth in the following claims.

What is claimed is:

1. A tugger cart comprising:
   a tugger frame comprising a bottom, a top, a first side, a second side, a locking portion, a front end and a rear end, wherein the first side, the second side, and the locking portion are joined together, wherein the first side, and the second side form an inside portion in between, and an outside portion;
   a plurality of guide wheels attached within the inside portion of the tugger frame, wherein the plurality of guide wheels together form a slanted line slanting upward from the front end to the rear end; and
   a plurality of casters attached to the bottom of the tugger frame;
   wherein the locking portion is configured to releasably secure a rider cart to the tugger frame when the rider cart is rolled onto the plurality of guide wheels.

2. The tugger cart of claim 1, wherein the locking portion comprises a latch system comprising at least one rocking arm pivotally attached at a pivot point, wherein the at least one rocking arm comprises a lock pedal near the rear end, an unlock pedal near the front end, and at least one locking peg protruding upwards from the at least one rocking arm, wherein the lock pedal is biased in an upward position and the unlock pedal is biased in a downward position, and wherein when the lock pedal is forced downward the unlock pedal and the at least one locking peg are forced upward.

3. The tugger cart of claim 2, wherein the at least one rocking arm comprises a rear arm pivotally attached to the locking portion at a first pivot point and a front arm pivotally attached to the locking portion at a second pivot point, wherein the rear arm comprises the lock pedal and the front arm comprises the unlock pedal and the at least one locking peg, and wherein the rear arm and the front arm interlock at a lock notch and an unlock notch.

4. The tugger cart of claim 3, wherein the lock pedal of the rear arm is spring biased upwards and the unlock pedal of the front arm is spring biased upwards, wherein when the rear arm and the front arm are interlocked in the unlock notch, the unlock pedal and the at least one locking peg are forced downward, wherein when pressure is applied to the lock pedal, the rear arm and the front arm are interlocked in the lock notch and the unlock pedal and the at least one locking peg are released upward.

5. The tugger cart of claim 4, further comprising a rider cart comprising:
   a rider frame having a front end, a rear end, a first side, a second side, a top, and a bottom;
   a plurality of casters attached to the bottom;
   a first rider wing and a second rider wing attached to the first side and the second side, wherein the first rider wing and the second rider wing are slanted upward from the rear end to the front end.

6. The tugger cart of claim 5, wherein the rider cart comprises at least one of shelves, sidewalls, handles, swinging doors, and top spreaders.

7. The tugger cart of claim 5, wherein the plurality of casters comprises a pair of fixed casters attached to the bottom near the front end and a pair of swivel casters attached to the bottom near the rear end.

8. The tugger cart of claim 5, wherein the rider cart is mounted onto the tugger cart in a locked position and dismounted from the tugger cart in an unlocked position, wherein the locked position comprises the rider wings rolling onto the vertical guide wheels and the rider frame applying force against the lock pedal and the at least one locking peg protruding upward blocking the rider cart from rolling off of the tugger cart, wherein the unlocked position comprises force applied to the unlock pedal forcing the at least one locking peg downwards and thereby allowing rider cart to dismount the tugger cart.

9. The tugger cart of claim 1, further comprising at least one anti tip wing attached to the inside portion of at least one of the first and second sides, wherein the at least one anti tip wing is oriented above the plurality of guide wheels.

10. The tugger cart of claim 1, further comprising at least one first horizontal guide wheel near the front end of at least one of the first and second sides.

11. The tugger cart of claim 10, further comprising at least one second horizontal guide wheel attached to the inside portion of at least one of the first and second sides above the anti tip wing.

12. The tugger cart of claim 1, wherein the locking portion includes a middle section between the first side and the second side.

13. The tugger cart of claim 12, wherein a swivel caster is attached to the first side and the second side, and two fixed casters are attached to the locking portion.

14. A tugger cart apparatus, comprising:
   a plurality of tugger carts comprising at least a first tugger cart and at least a second tugger cart; and
   wherein the first tugger cart and the second tugger cart are releasably attachable; and
   wherein each of the plurality of tugger carts comprises:
      a tugger frame comprising a bottom, a top, a first side, a second side, a locking portion, a front end and a rear end, wherein the first side, the second side, and the locking portion are joined together, wherein the first side, and the second side form an inside portion in between, and an outside portion;
      a plurality of guide wheels attached within the inside portion of the tugger frame, wherein the plurality of guide wheels together form a slanted line slanting upward from the front end to the rear end; and
      a plurality of casters attached to the bottom of the tugger frame;
      wherein the locking portion is configured to releasably secure a rider cart to the tugger frame when the rider cart is rolled onto the plurality of guide wheels.

15. The apparatus of claim 14, wherein the outside portion of the first and second sides of the second tugger cart further comprises a protruding rim with a top surface, wherein the top surface comprises at least one hitch frame attachment post and a ball hitch.

16. The apparatus of claim 15, wherein the first tugger cart further comprises an attached frame comprising a first side and a second side, wherein the second side comprises a hitch receiver and the first side is releasably attachable to the hitch frame attachment post.

* * * * *